June 3, 1941.　　　　G. D. STAPEL　　　　2,244,575
BINDER CONTROL
Filed May 24, 1939　　　　3 Sheets-Sheet 1
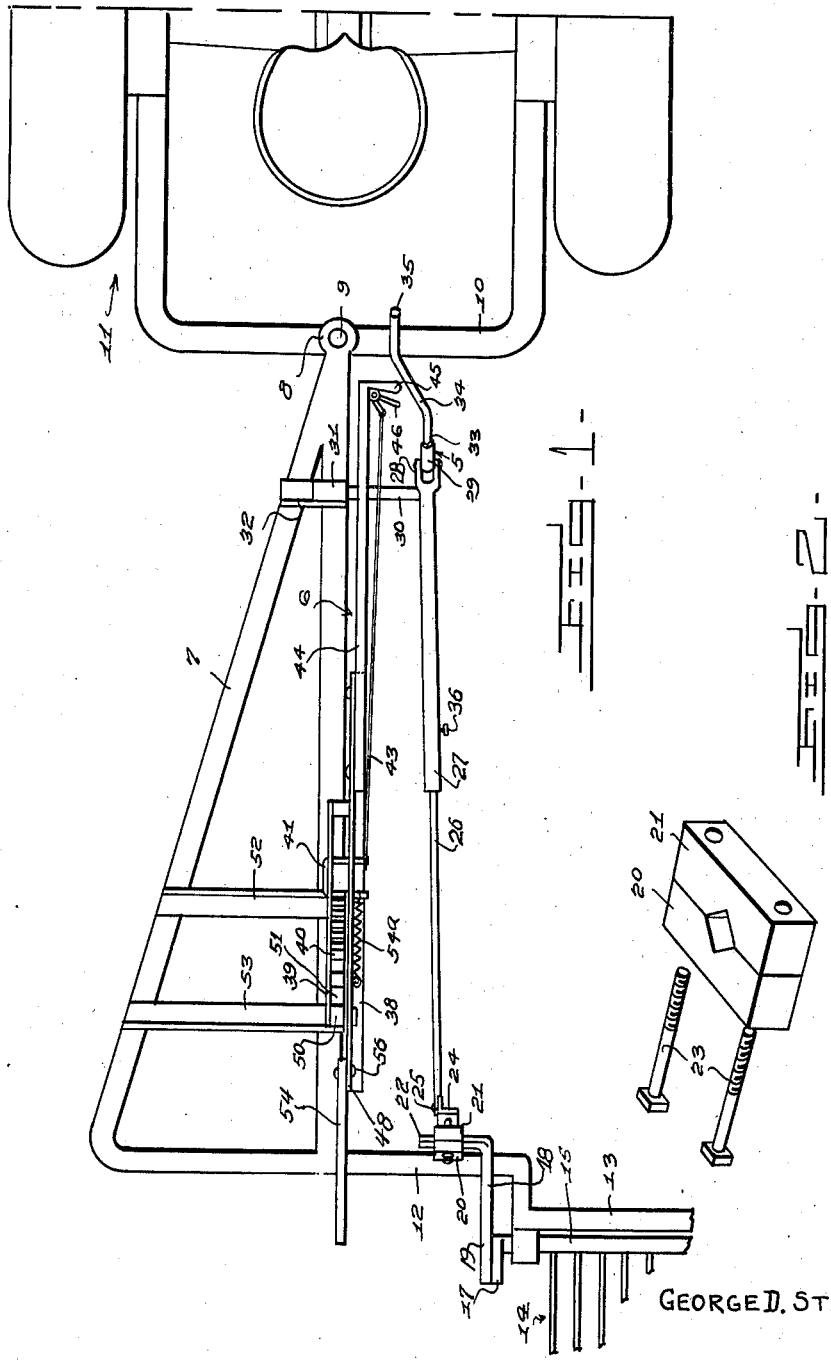
Inventor
GEORGE D. STAPEL,
By Clarence A. O'Brien
and Hyman Berman
Attorneys June 3, 1941.　　　G. D. STAPEL　　　2,244,575
BINDER CONTROL
Filed May 24, 1939　　　3 Sheets-Sheet 2
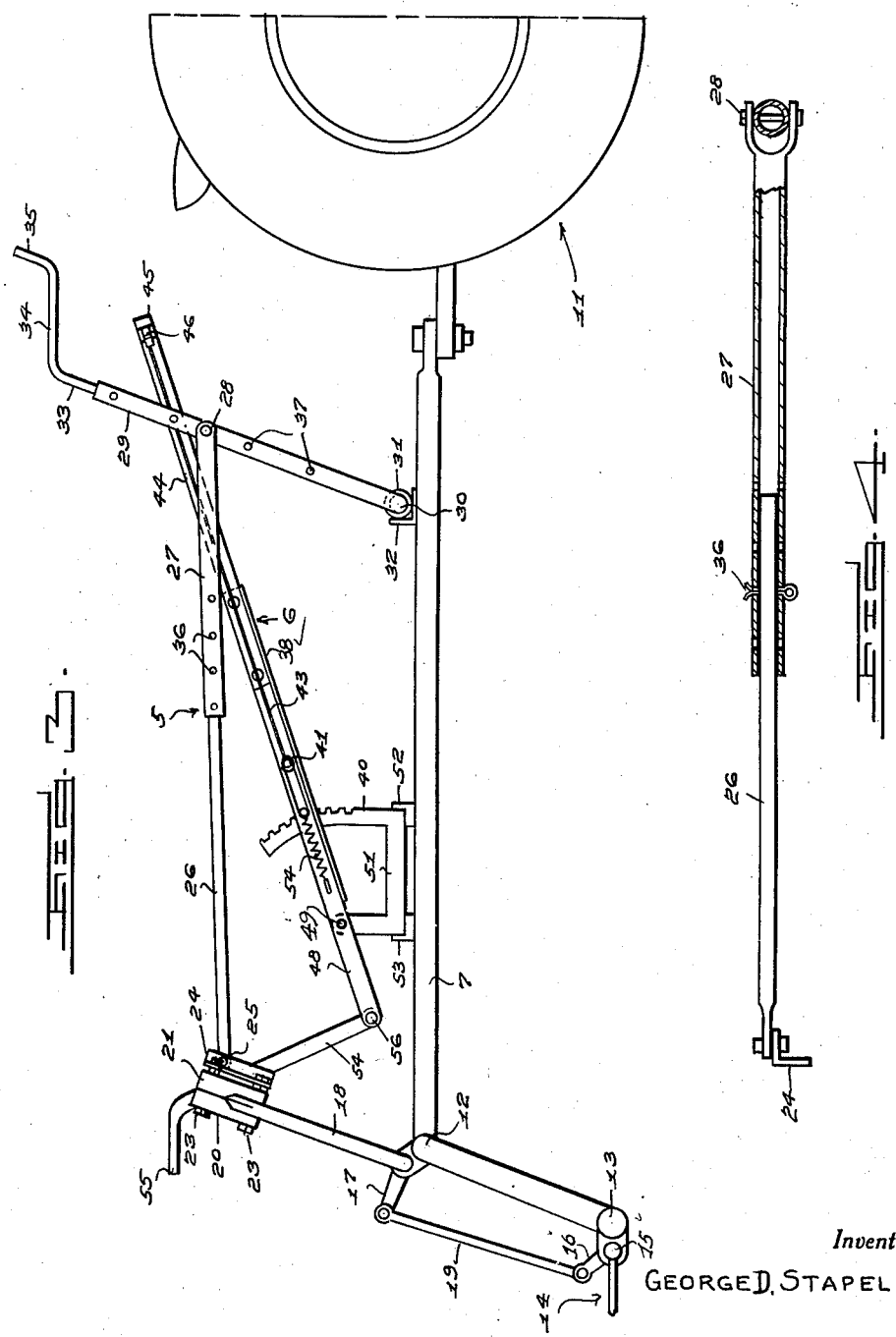
Inventor
GEORGE D. STAPEL,
By Clarence A. O'Brien
and Hyman Berman
Attorneys June 3, 1941.　　　G. D. STAPEL　　　2,244,575
BINDER CONTROL
Filed May 24, 1939　　　3 Sheets-Sheet 3
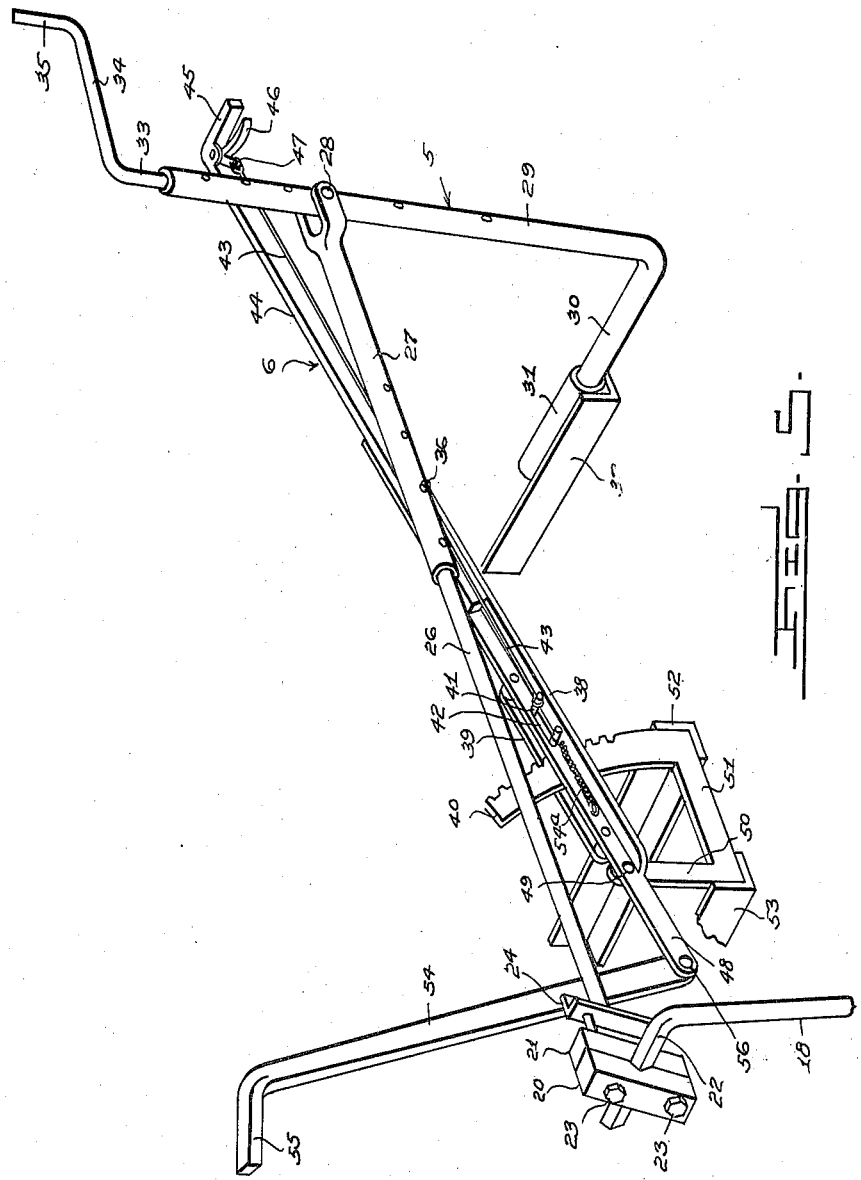
Inventor
GEORGE D. STAPEL,
By Clarence A. O'Brien
and Hyman Berman
Attorneys Patented June 3, 1941

2,244,575

UNITED STATES PATENT OFFICE 2,244,575

BINDER CONTROL

George D. Stapel, Waucoma, Iowa

Application May 24, 1939, Serial No. 275,510

3 Claims. (Cl. 56—22)

This invention appertains to new and useful improvements in controls for binders and other agricultural machines.

The principal object of the present invention is to provide a control for binders whereby the operator of the tractor drawing the binder can also act to control the binder without the assistance of a helper.

Another important object of the invention is to provide a control for interposition between a binder and the draft tractor whereby the operator of the tractor can control both the cutting means and bundle carrier of the binder.

These and other objects and advantages of the invention will become apparent to the reader of the following specification.

In the drawings:

Figure 1 represents a top plan view of the control and draft means.

Figure 2 is an enlarged perspective view (partly exploded) of the clamp assembly.

Figure 3 is a side elevational view of the control and draft means.

Figure 4 is an enlarged longitudinal sectional view through the telescopic connection.

Figure 5 is a perspective view of the control.

Referring to the drawings wherein like numerals designate like parts, it can be seen that the numeral 5 generally refers to the control for the bundle carrier of the binder, while numeral 6 generally refers to the control for the cutter bar.

The assembly consists of a horizontally disposed substantially trianglar-shaped frame 7, the same tapering forwardly and having the coupling eye 8 at its forward end for receiving the bolt 9 on the tail-piece 10 of the tractor generally referred to by numeral 11.

The rear end of the frame 7 is provided with the laterally disposed extension 12 which connects to the bar 13 of the bundle carrier generally referred to by numeral 14 of the binder. Numeral 15 represents the shaft for dumping the carrier 14, and this has the crank 16 to which the crank arm 17 of the bar 18 is connected by the pivotal tie rod 19.

A clamp structure consisting of the blocks 20—21 are clamped against the right angularly disposed arm 22 at the upper end of the bar 18 by bolts 23 passing therethrough and also through one flange of the short angle bar 24. The blocks 20 and 21 are notched to receive the polygonal lateral arm 22 as shown in Figure 3.

Pivotally connected to the remaining flange of the short angle bar 24 as at 25 is the rear end of the elongated rod 26 which has its forward end slidably disposed in the elongated tube 27, the forward end of which is pivotally secured as at 28 to the intermediate portion of the swingable tube 29, the latter having the horizontally disposed portion 30 at its lower end disposed through a bearing 31 supported by the angle bars 32 bridging the side portions of the frame 7 at the forward ends thereof.

A control rod 33 extends downwardly into the tube 29 and has the forwardly offset portion 34 terminating in the upstanding hand grip 35.

Cotter pins 36 can be disposed through the tube 37 and rods 26 to properly hold the same in adjusted relation to each other, and the cotter pins 37 can be disposed through the tube 29 and rod 33 to hold these two elements 29 and 33 in the proper adjusted relation.

The tube 29 can be rocked by the hand grip 35 whenever desired for the purpose of operating the rod 26, bar 18, crank arms 17 and 16 for the purpose of controlling the bundle carrier 14 for the purpose of releasing the bundles carried thereby and resetting the carrier to receive further bundles.

The means for controlling the cutter bar consists of the provision of the elongated angle bar 38 to one side of which the strap 39 is secured in spaced relation therewith so that the quadrant rack 40 can protrude upwardly between the same and the angle bar 38.

A U-shaped detent 41 has its leg portions disposed through the slot 42 and through a pair of spaced openings in the strap 39. A slight movement of this U-shaped detent 41 is allowable in the slot 42. The extremity of one leg of this detent has the cable or rod 43 attached thereto.

A bar 44 has its rear end portion secured to the angle bar 38 and its forward end has the laterally disposed hand grip 45. A rockable hand grip 46 has the finger member 47 extending therefrom and to this is connected the cable 43. Obviously by operating the hand lever 46 the U-shaped detent 41 can be pulled away from the quadrant rack 40 so that the bar 44 can be elevated or lowered with the extension 48 fulcrumed as at 49 on the post 50, this post 50 rising from the base member 51 extending from the quadrant rack 40. This base member 51 is supported and suitably secured to the angle members 52—53 which bridge the side members of the frame 7.

A tension spring 54a has one end anchored to the angle bar 38 while its opposite end is connected to the adjacent leg of the U-shaped detent 41.

The operating arm 54 having the cutter bar connecting foot 55 is pivotally secured as at 56 to the extending member 48 of the angle bar 38.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A binder control for binders including a cutter and a bundle carrier; a draft frame, a bundle carrier dumping crank, a lever swingably mounted on the frame, a bearing on the crank, a connection between the lever and the bearing, an elongated hand bar, a substantially U-shaped member mounted on the frame, said hand bar being rockably mounted on one leg of the U-shaped member, the other leg of the U-shaped member provided with a rack extension, a cutter operating arm pivotally connected to one end of the bar, detent means between the bar and the rack, and a handle on the bar, said handle being located adjacent the swingable lever.

2. A binder control for binders including a cutter and a bundle carrier; a draft frame, a bundle carrier dumping crank, a lever swingably mounted on the frame, a bearing on the crank, a connection between the lever and the bearing, an elongated hand bar, a substantially U-shaped member mounted on the frame, said hand bar being rockably mounted on one leg of the U-shaped member, the other leg of the U-shaped member provided with a rack extension, a cutter operating arm pivotally connected to one end of the bar, detent means between the bar and the rack, and a handle on the bar, said handle being located adjacent the swingable lever, said detent means consisting of an elongated member secured to the hand bar in spaced relation therewith to define a guideway receiving said rack extension, said elongated member and hand bar being slotted, said detent means further including a pin disposed through the slots and being engaged with the teeth of the rack and a member extending longitudinally of the hand bar from the pin to the handle whereby the said pin can be operated from the handle end of the hand bar.

3. A binder control for binders including a cutter and a bundle carrier; a draft frame, a bundle carrier dumping crank, a lever swingably mounted on the frame, a bearing on the crank, a connection between the lever and the bearing, an elongated hand bar, a substantially U-shaped member mounted on the frame, said hand bar being rockably mounted on one leg of the U-shaped member, the other leg of the U-shaped member provided with a rack extension, a cutter operating arm pivotally connected to one end of the bar, detent means between the bar and the rack, and a handle on the bar, said handle being located adjacent the swingable lever, said hand bar being provided with an elongated member secured to one side thereof and in spaced relation therewith, said elongated member and hand bar being provided with registering slots, a U-shaped member having its leg portions disposed through the slots, an elongated member extending from the handle of the hand bar to one leg of the U-shaped member, and a spring having one end anchored to the hand bar and its other end connected to the remaining leg of the U-shaped member to hold the U-shaped member engaged with the teeth of the rack.

GEORGE D. STAPEL.